June 13, 1950  H. C. GOODRICH, JR  2,511,580

RECIPROCATING MOTOR SYSTEM

Filed Feb. 27, 1948  2 Sheets-Sheet 1

INVENTOR
HUNTER C. GOODRICH, JR.
BY
ATTORNEY

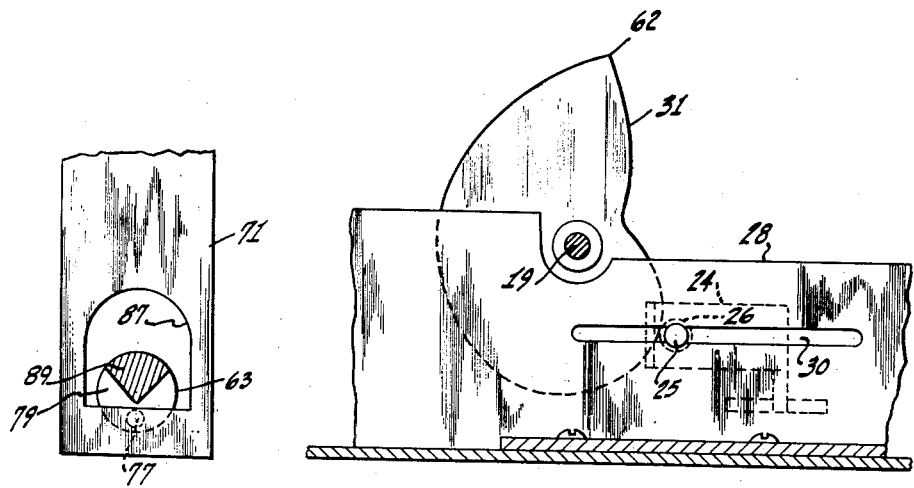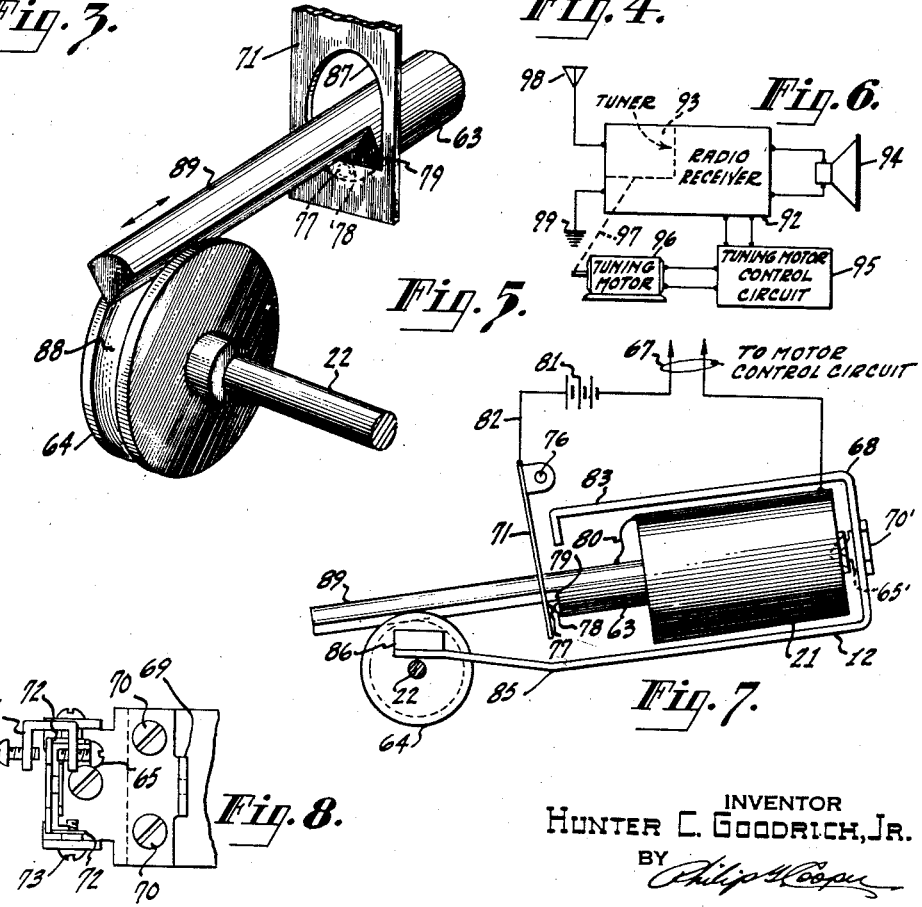

Patented June 13, 1950

2,511,580

UNITED STATES PATENT OFFICE 2,511,580

RECIPROCATING MOTOR SYSTEM

Hunter C. Goodrich, Jr., Collingswood, N. J., assignor to Radio Corporation of America, a corporation of Delaware Application February 27, 1948, Serial No. 11,607

5 Claims. (Cl. 318—21)

1

This invention pertains to radio receivers and more particularly to a signal seeking receiver for automatic tuning. More specifically, the invention pertains to a signal seeking radio receiver which utilizes a novel motor for operating the tuner during the signal seeking operation.

In a signal seeking receiver, when it is desired to change to a new station, ordinarily a pushbutton is used to change the radio from playing condition to signal seeking condition. During the signal seeking condition, the tuning elements of the receiver are driven by a tuning motor, causing the receiver to automatically scan the frequency spectrum. When a signal of sufficient strength is encountered, a portion of the received signal is applied to a tuning motor control circuit which acts to remove the energy supplied to the tuning motor, causing the tuning operation to automatically cease, thereby returning the receiver to playing condition and permitting the receiver to remain tuned to the particular received signal. Such control circuits are known to the art; in general they usually consist of a frequency selective circuit, the output of which is fed to the control grid of a control tube, and a relay responsive to the control tube which controls the energy applied to the tuning motor. Obviously the accuracy of the tuning operation is dependent on the rapidity with which the tuner motion can be brought to a stop after the motor energy supply circuit is broken. The present invention contemplates a radio receiver employing a motor having the desired stopping characteristics. Any control circuit capable of breaking the current supply to the motor when a signal has been properly tuned in can be used with the tuning motor of the present invention.

Heretofore, signal seeking tuners have utilized a more or less conventional motor for operating the tuner.

The present invention utilizes a unique motor which may, in general, be employed with any type of tuning system wherein an electrical motor is used for driving a mechanical element, such as the shaft of a gang condenser, or the moving mechanism of a permeability tuner wherein a plurality of cores are simultaneously moved within the tuning coils.

Tuning devices employing a motor of the rotative type have certain undesirable characteristics in that the motor armature ordinarily rotates at high speed and therefore has considerable momentum. When the motor is deenergized the rotor will coast appreciably, driving the tuning mechanism past the desired point of resonance. Consequently, an electrically operated

2 clutch is usually required. Careful construction of the clutch is necessary to avoid even a slight movement of the tuner, which might shift the resonant frequency of the system during the releasing operation of the clutch. Further, the manufacture of equipment using a rotative type motor is generally comparatively costly in that the use of such a motor in a tuning system ordinarily requires reduction gears, a clutch, expensive bearings and other incidentals resulting from the high speed of operation of the motor. Further, the moving parts in the device ordinarily increase the comparative cost of maintenance.

It is, therefore, an object of the invention to provide a motor for electrical tuning of a radio which motor stops almost instantaneously due to its inherent characteristics without the use of any external mechanical elements.

It is a further object of the present invention to provide a radio receiver having a novel tuning motor which permits automatic and complete freedom of manual control at all times.

Another object of the invention is to provide a radio having a novel motor means for automatically operating the tuner, which motor means is substantially instantaneous in stopping, is quiet in operation, permits automatic or manual control at all times, and is lower in installation and maintenance cost than a rotative type of motor means for operating a similar tuner.

A further object of the invention is to provide a linear vibratory magnetic motor for operating the tuner of a radio, or other apparatus.

A further object of the invention is to provide a linear reciprocating magnetic motor for imparting rotary motion to a shaft.

A further object of the invention is to provide a radio having a novel vibratory motor for operating the tuner during the signal seeking operation.

Other objects of the invention may be apparent and will be better understood from a perusal of the following description taken in conjunction with the accompanying drawings in which:

Fig. 3 is a view taken along lines 3—3 of Fig. 2 showing the plunger disposed in relation to the armature of the motor.

Fig. 4 is a view taken substantially along lines

Figure 1:
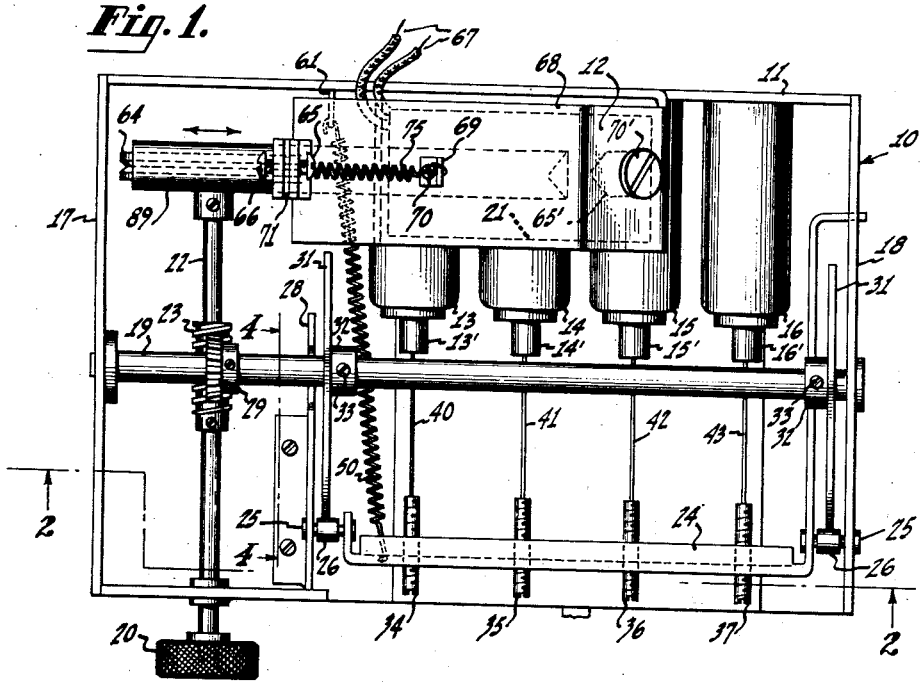
Fig. 1 is a top view of a radio tuner utilizing the motor of the invention for tuning a permeability tuned radio receiver.

4—4 of Fig. 1 showing the motor-operated cam in relation to the core bar for operating the cores of the tuning coils.

Fig. 5 is an enlarged perspective view of the plunger and the drive-wheel of the magnetically vibratory motor.

Fig. 6 is a block diagram of a radio receiver utilizing a tuning motor control circuit for operating the tuning motor of the invention which in turn operates the tuner of the radio receiver.

Fig. 7 is a pictorial representation and schematic diagram showing the magnetic and electrical paths of the novel motor of the invention.

Fig. 8 is a top view of the armature in relation to the stop members for controlling the latitude of motion of the motor armature.

Figure 2:
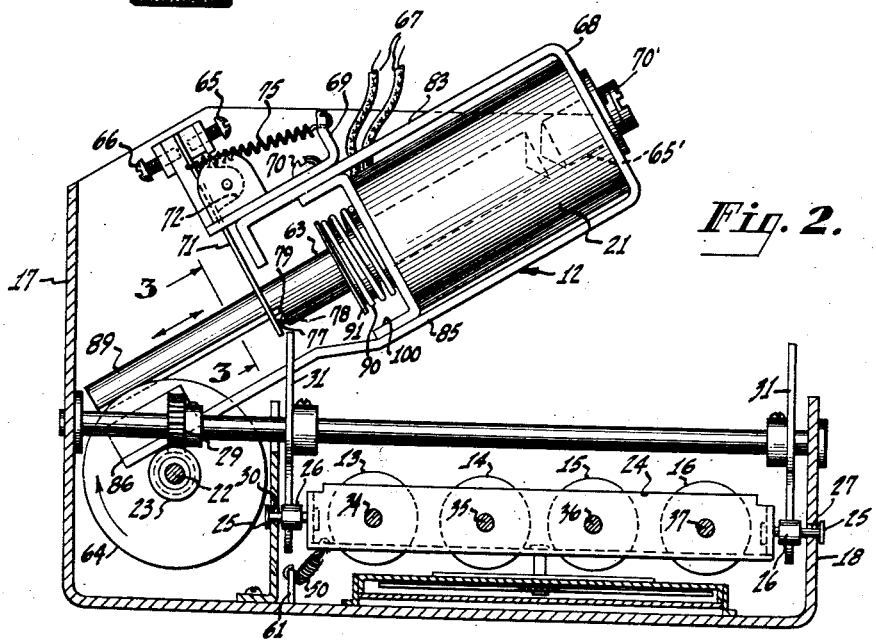
Fig. 2 is an elevation taken along lines 2—2 of Fig. 1 of the permeability tuner utilizing the invention.

Referring to the drawings and more particularly to Figs. 1 and 2 there is shown a tuner 10 having a frame which is used for supporting the motor 12 and other mechanical and electrical elements associated with the tuner.

The motor 12 may be used for operating an electrical tuner of either the capacitive or the permeability type, the present invention being described in conjunction with a permeability tuner having tuning coils 13, 14, 15, and 16. The four coils shown are merely representative of a conventional permeability tuner, wherein coils 13 and 14 may represent the antenna coils, and 15 and 16 may represent the RF coil and the oscillator coil respectively. While the number of tuning coils may vary in different receivers, four coils are shown in the present invention merely as a representative presentation of one type of radio receiver utilizing a permeability tuner.

The side frames 17 and 18 have a shaft 19 disposed therebetween and journaled therein, which shaft may be rotated either by the manual tuning knob 20 or the motor drive wheel 64. In both instances the shaft 22 will be rotated to turn the worm gear 23 secured to the shaft 22, so that the spur gear 29 which is secured to the shaft 19 and which engages the worm gear 23 will also be rotated. The shaft 22 is a unitary member having the motor drive wheel 64 secured adjacent one end thereof and the manual tuning knob 20 adjacent the other end thereof, so that the receiver may at all times be tuned either by the manual tuning knob, or the motor drive wheel which is automatically operated in response to energization of the motor 12 by the associated control circuits. A core bar 24 has pins 25 on either end thereof. The pins 25 each have a roller 26 freely rotatable thereon. The side frame 18 has a slot 27 disposed therein and the guide plate 28 has a similar slot 30 disposed therein. The pins 25 are secured to the opposing ends of the core bar 24 and are disposed in the slots 27 and 30 respectively so that movement of the core bar 24 will be permitted by movement of the rollers 26 along the opposing parallel slots 27 and 30. A pair of cams 31 each have a hub 32 which is secured to the shaft 19 by screws 33. The tuning coils 13 to 16 inclusive, each have a complemental core 13' to 16', inclusive. Tuning screws 34, 35, 36 and 37 are threadedly connected to the core bar 24. Core wires 40, 41, 42, and 43 are each secured to their respective cores and tuning screws so that manipulation of any of the tuning screws such as 34 to 37 inclusive will change the position of the cores 13' to 16' inclusive within their respective coils 13 to 16 inclusive. The core wires 40 to 43 inclusive are substantially rigid so that movement of the core bar 24 in the guide slots 27 and 30 will likewise cause the cores to be moved within the tuning coils 13 to 16 inclusive.

Once the tuning screws 34 to 37 are adjusted for proper tuning alignment of the radio, any further manipulation of the cores within the tuning coils will be only in response to movement of the core bar 24 by the cams 31. A retractal spring 50 is secured at one end thereof to a protuberance 61 which protuberance is secured to the frame 11. The opposing end of the retractal spring 50 is secured to the core bar 24, so as to urge it in a direction toward the coils 13 to 16 inclusive.

Fig. 4 shows a cam 31 secured to the shaft 19 with the cam engaging a roller 26, said roller being rotatably mounted on the pin 25 which is secured to the core bar 24. The slot 30 is a guide means for the pin 25. It is noted in Figs. 1 and 2 that a pair of cams are provided on the shaft 19 and they are identically disposed so that rotation of the shaft 19 will cause the cams to operate the core bar 24 evenly, so that there is always an equal movement of the cores within the tuning coils when the core bar is moved in response to rotation of the cam.

The cam is so shaped that rotation of the shaft in the direction of the arrow X (Fig. 4) will cause the core bar 24 to move to the right in the slot 30 until the roller 26 moves past point 62 of the cam 31 and slides down the steep portion of the cam. The retractal spring 50 is constantly urging the core bar 24 against the cam 31. Rotation of the cam will cause the movement of the cores within the tuning coils in response to movement of the core bar 24. The gradual curve of the cam 31 will permit a gradual withdrawing of the cores from their respective tuning coils so that the gradual movement of the cores within the tuning coils will cause a scanning over the frequency band of the radio receiver.

When the point 62 of the cam 31 passes the roller 26, the action of the retractal spring 50 will cause the core bar to be snapped back to the left and permit the retractal spring to urge the cores moved by the core bar to their innermost position in the tuning coils which tunes the receiver to the low frequency end of the band.

The magnetic vibratory tuning motor 12 as shown in Fig. 2 is mounted on frame 11 in any convenient manner, such as by a bracket, to so dispose the plunger 63 and the drive wheel 64 so that ultimate rotation of the drive wheel by the plunger will cause rotation of the shaft 22. The motor 12 has a magnetically permeable core 65' disposed in the center of a coil 21 which coil terminates in leads 67 for connection to the motor control circuit. A yoke 68 of magnetically permeable material is secured to the core 65 in any convenient manner such as by a screw 70'. The upper portion of the yoke 68 has a bracket 69 secured thereto by means of screws 70.

Figs. 2 and 8 show an armature 71 which has an ear 72 on either side thereof for pivotally mounting the armature, by means of screws 73 on the bracket 69. The upper end of the bracket 69 has a U-shaped formation 74 having adjustment stop screws 65 and 66, which screws are threadedly connected to the U-shaped members to control the extent of the movement of the armature 71 about its pivot screws 73. A retractal spring 75 connects the upper end of the armature 71 to the bracket 69 so that the spring urges the upper end of the armature 71 against the stop screw 65 when the motor is deenergized.

Referring to Fig. 7 the electrical and magnetic paths of the motor may be clearly seen. The armature 71 is pivoted at the apertures 76. The lower portion of the armature has a contact 77 thereon which engages a contact 78 secured to a shoulder 79 of the plunger 63. Contacts 77 and 78 are closed by action of the expansion spring 90 which normally urges the plunger to the left, away from the core 65' within the coil 21. One of the terminals 67 is connected to one end of the coil 21 while the other end of the coil is connected by means of a flexible lead 80 to the plunger 63. The other lead of the terminals 67 is connected to a source of energy, such as battery 81, with the opposite side of the battery connected through a lead 82 to the armature 71. The upper end of the yoke 68 terminates in an L-shaped armature flux arm 83 with a portion of the flux arm being spaced from the magnetically permeable armature 71. The size of the armature flux arm and the armature is sufficient to permit attraction therebetween to draw in the lower end of the armature and urge the upper end against stop 66 when the coil 21 is energized. The lower portion of the yoke 68 has a drive wheel flux arm 85 which is of magnetically permeable material and connects the core 65' with the head portion 86. The head portion 86 is also of magnetically permeable material and is disposed adjacent the drive wheel 64 and spaced therefrom to prevent frictional drag on the drive wheel. The size and disposition of the head portion 86 is such that a low reluctance magnetic path is provided between the magnetic drive wheel 64 and the head portion 86. The magnetic path is completed through the plunger 63. A brace 100 between the arms 83 and 85 is of non-magnetic material.

Figs. 3 and 5 show the plunger 63 passing through the opening 87 in the armature. The plunger 63 has a V-shaped portion on the left end thereon. The drive wheel 64 has a V-shaped groove 88 around its circumference, said groove 88 being complemental with the V-shaped plunger portion 89. The preferably V-shaped plunger portion with its complemental groove provide one form of engaging surface between the plunger and the drive wheel.

From the foregoing it will be seen that there is a magnetic path provided for the armature through the armature flux arm, the core, and the plunger, the purpose of said magnetic flux path being to cause the attraction of the armature 71 toward the armature flux arm 83 upon energization of the coil 21. There is also a flux path from the core 65, through the drive wheel flux arm 85, the head portion 86 through a small air gap to the drive wheel 64, and thence through the plunger 63 back to the core.

When the motor 12 is energized by joining of terminals 67, the plunger 63 will be drawn within the coil 21 against the force of spring 90 by the magnetic force produced by the coil 21. The stop screws 65 and 66 limit the motion of the armature. Energization of the motor 12 will cause the lower portion of armature 71 to be drawn inwardly, the upper portion of the armature engages stop 66 thereby opening the contacts 77 and 78, and deenergizing the motor. This permits the spring 90 to urge the plunger to the left away from the core 65'. Simultaneously upon deenergization, the retractal spring 75 (Fig. 2) will cause the armature to be drawn further away from the plunger 63 against the stop 65.

It will therefore be seen that a reciprocating motion is provided by the plunger 63 being drawn within the solenoid coil 21 during energization of the coil 21 and that the spring 90 will urge the armature in the opposite direction away from the core of the solenoid during deenergization of the coil 21, whereupon the contact 77 and 78 engage each other to again energize the motor, which operation repeatedly produces a vibratory action as long as the terminals 67 are closed. At the same time, each time the motor is energized a strong magnetic flux will flow between the plunger 63 and the drive wheel 64 which will cause the plunger and the drive wheel to adhere to each other. Consequently, when the plunger moves to the right the drive wheel and the shaft 19 are rotated through an angle determined by the axial stroke of the plunger. Each time the motor 12 is deenergized the attraction between the plunger and drive wheel is removed. When the plunger moves to the left under action of spring 90 it slides over the surface of the groove 88 in the drive wheel. The drive wheel will remain stationary since the frictional engagement is insufficient to move the wheel against the restraining action of the worm gear 23 and a spur gear 29 in conjunction with the mechanical elements with which the shaft 19 is loaded.

It will therefore be seen that repeated energization and deenergization of the motor will cause a sticking action and a sliding action, respectively between the plunger and the drive wheel, thereby providing a uni-directional rotation of the drive wheel in controlled steps as long as the terminals 67 are closed by the motor control circuit.

In operation when a signal has been properly tuned in and the control circuit has opened the connection between terminals 67, coil 21 is deenergized, and the rotation of the tuning elements thereupon stops almost instantaneously as a result of the inherent friction load on shafts 19 and 22 and their mechanically coupled members. This instantaneous stopping is essential for accurate tuning, since, for example, a permeability tuner receiver covering the standard broadcast band from 540 kc. to 1600 kc. with a tuning core travel of one inch will be detuned approximately one kilocycle for each one thousandth of an inch of coasting of the core bar.

It may be seen that the tuning motor in no way interferes with manual tuning of the receiver by knob 20, since as long as coil 21 is deenergized drive wheel 64 slides freely against plunger portion 89 during rotation of the drive wheel in either direction.

In a motor having given characteristics, the termination of the stroke would ordinarily be determined by the duration of the contact closure of contact set 77—78, the spacing between the contact set being in turn controlled by the setting of the adjustable stop screws 65 and 66. Depending on the desired operating characteristics of the motor, the contact set per se may be of prime importance. While a specific type of contact set operation is shown for the armature 71 it is to be understood that any conventional switching device operated by the plunger motion may be employed.

While step by step operation per se may be accomplished by a toothed wheel and ratchet arrangement, the length of the steps is fixed by the spacing of the teeth on the toothed wheel, therefore making the minimum movement of one step at least the distance between the spacing of two adjacent teeth. Any greater steps must be in multiples of the tooth spacing. However, in the present invention, the movement per step depends on the movement allowed the armature, which determines the plunger stroke defined by the latitude of movement of the contacts 77—78. The movement per step is thus continuously adjustable over a wide range by adjustment of the gap between screw stops 65 and 66. While the armature 71 is shown as being a simple rigid member it is to be understood that mechanical means may be used for multiplying the contact motion obtained for a given plunger stroke. Thus the minimum stroke achieved need not be dependent on the contact spacing required for satisfactory breaking of the circuit.

The block diagram shown in Fig. 6 utilizes one form of conventional radio receiver 92 having a conventional tuner 93 with a transducer of any suitable type such as a speaker 94. A tuning motor control circuit represented by block 95 has its input suitably connected to the radio receiver. The output of the tuning motor control circuit 95 is connected to the tuning motor 96, which tuning motor is connected by a shaft 97 to operate the tuner 93.

While one embodiment of the invention has been presented herewith, it is to be understood that changes and modifications may be made within the scope of the appended claims.

What is claimed is:

1. A linear reciprocating magnetic motor for imparting rotary motion to a shaft comprising in combination, an energizable winding, a linear member of magnetizable material reciprocally responsive to and movable in one direction upon energization of said winding, a rotatable member of magnetizable material connected to said shaft and disposed adjacent to said linear member, means for moving said linear member in the opposite direction upon de-energization of said winding, contact means for intermittently energizing said winding, said contact means including a movable contact armature of magnetizable material with a first electrical contact surface, and a second contact surface movably responsive to the movement of said linear member, a low reluctance armature flux arm providing a magnetic path from said winding to said armature whereby said armature is movably responsive to the energization of said winding in the direction of motion of said linear member thereby maintaining engagement of said contacts over a portion of movement of said linear member and increasing the stroke of said linear member, and adjustable stop means for said armature to vary the stroke of said linear member.

2. A radio tuning device having tuning means for varying the frequency response of radio apparatus over a predetermined continuous frequency range including a motor for driving said tuning means, said motor comprising an electrically energizable winding, a reciprocatory member of magnetizable material responsive to energization of said winding, a rotatable member of magnetizable material responsive to movement in one direction of said reciprocal member during energization of said winding, resilient means for moving said reciprocal member in the opposite direction, a switch for intermittently energizing said winding, a movable armature of magnetizable material for said switch having one switch contact thereon, mounting means for said armature, adjustable stop means for determining the limits of motion of the armature, an armature flux arm of magnetizable material located near one limit of motion of said armature, a further contact for said switch on said reciprocatory member, and means providing a low reluctance magnetic path including said armature, said member and said flux arm, whereby said armature is attracted toward the armature flux arm upon energization of the winding thereby maintaining said switch contacts in a closed position during an extended portion of the stroke of said member in response to the energization of said winding, the length of said stroke thereby being adjustable through said stop means.

3. In a radio tuning device having tuning means for varying the frequency response of a radio over a predetermined continuous frequency range including a step-by-step motor for driving said tuning means comprising an energizable winding, a reciprocal member of magnetizable material responsive to energization of said winding, a rotatable member of magnetizable material responsive to movement in one direction of said reciprocal member during energization of said winding, means for moving said reciprocal member in the opposite direction, contact means for controlling energization of said winding, including a high permeability armature carrying one contact and a further contact movably responsive to movement of said reciprocal member, a magnetic armature flux arm extending near said armature, a low reluctance magnetic path including said flux arm, said armature and said reciprocal member for attracting said armature in the same direction as the movement of said reciprocal member upon the energization of said winding thereby maintaining energization of said winding over a longer stroke of said reciprocal member.

4. In a radio tuning device having tuning means for varying the frequency response of a radio over a predetermined continuous frequency range including a step-by-step motor for driving said tuning means, said motor comprising an energizable winding, a reciprocatory member of magnetizable material responsive to energization of said winding, a rotatable member of magnetizable material responsive to movement in one direction of said reciprocatory member during energization of said winding, permeable means completing a closed magnetic path through the last two said means, means for moving said reciprocatory member in the opposite direction, a pivotally mounted armature having a contact thereon, a contact carried by said reciprocatory member for engagement with the armature contact, means causing energization of said winding upon closing of said contacts, means continuously adjustable for said armature to determine the stroke of said reciprocatory member, resilient means to restore said armature to its retracted position during deenergization of said winding and magnetic means for maintaining said contacts in a closed position during a portion of the movement of said reciprocatory member.

5. A motor comprising an energizable winding, a linearly movable driver member of magnetizable material responsive to energization of said winding, a rotatable driven member of magnetizable material responsive to movement in one direction of the linear member during energization of said winding, means for moving the linear member in the opposite direction, switching means for intermittently energizing said winding, and means for establishing predetermined operating limits for said driver member including a pair of switch contacts, at least one of which is movable with said driver member, said contacts connected to said switching means and an adjustment for determining the amount of movement of said movable contact.

HUNTER C. GOODRICH, Jr.

REFERENCES CITED

The following references are of record in the file of this patent:

UNITED STATES PATENTS

| Number | Name | Date |
| --- | --- | --- |
| 398,926 | Balet | Mar. 5, 1889 |
| 2,098,331 | Bowman | Nov. 9, 1937 |
| 2,207,467 | Muller | July 9, 1940 |
| 2,304,871 | Andrews | Dec. 15, 1942 |